US009001788B2

(12) United States Patent
Watfa et al.

(10) Patent No.: US 9,001,788 B2
(45) Date of Patent: Apr. 7, 2015

(54) METHOD AND APPARATUS FOR CANCELING A CIRCUIT SWITCHED FALLBACK

(71) Applicant: Interdigital Patent Holdings, Inc., Wilmington, DE (US)

(72) Inventors: Mahmoud Watfa, Saint Leonard (CA); Ulises Olvera-Hernandez, Kirkland (CA); Behrouz Aghili, Commack, NY (US); Shankar Somasundaram, Mountain View, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 165 days.

(21) Appl. No.: 13/716,528

(22) Filed: Dec. 17, 2012

(65) Prior Publication Data

US 2013/0107811 A1 May 2, 2013

Related U.S. Application Data

(63) Continuation of application No. 12/683,212, filed on Jan. 6, 2010, now Pat. No. 8,340,023.

(60) Provisional application No. 61/142,787, filed on Jan. 6, 2009.

(51) Int. Cl.
*H04W 4/00* (2009.01)
*H04W 36/00* (2009.01)
*H04W 76/02* (2009.01)

(52) U.S. Cl.
CPC ............ *H04W 4/00* (2013.01); *H04W 36/0022* (2013.01); *H04W 76/025* (2013.01); *H04W 76/027* (2013.01)

(58) Field of Classification Search
None
See application file for complete search history.

(56) References Cited

U.S. PATENT DOCUMENTS

| 8,340,023 B2 * | 12/2012 | Watfa et al. ................... 370/328 |
| 2009/0258671 A1 * | 10/2009 | Kekki et al. ............... 455/552.1 |
| 2010/0070632 A1 | 3/2010 | Song et al. |
| 2010/0098023 A1 | 4/2010 | Aghili et al. |
| 2010/0113010 A1 | 5/2010 | Tenny et al. |
| 2010/0120432 A1 | 5/2010 | Watfa et al. |
| 2011/0188470 A1 | 8/2011 | Lu et al. |

(Continued)

FOREIGN PATENT DOCUMENTS

| CN | 101296518 A | 10/2008 |
| WO | 2008/148432 | 12/2008 |

OTHER PUBLICATIONS

IEEE Computer Society and the IEEE Microwave Theory and Techniques Society, "IEEE Standard for Local and Metropolitan Area Networks Part 16: Air Interface for Fixed Broadband Wireless Access Systems", IEEE Std 802.16—2009, (May 29, 2009).

(Continued)

*Primary Examiner* — Anh-Vu Ly
(74) *Attorney, Agent, or Firm* — Volpe and Koenig, P.C.

(57) ABSTRACT

A method and apparatus may be used to cancel a communication session. The apparatus may transmit a message that indicates a request to cancel the communication session. The apparatus may continue a Packet Switched (PS) session without performing an intersystem change. If the apparatus receives an intersystem change command, the apparatus may transmit a message to reject the intersystem change command, or it may ignore the intersystem change command.

15 Claims, 10 Drawing Sheets

(56) References Cited

U.S. PATENT DOCUMENTS

2011/0280217 A1 11/2011 Drevon et al.
2012/0307735 A1* 12/2012 Aghili et al. ............... 370/328

OTHER PUBLICATIONS

IEEE Computer Society, "Information Technology—Telecommunications and Information Exchange Between Systems—Local and Metropolitan Area Networks—Specific Requirements—Part 11: Wireless LAN Medium Access Control (MAC) and Physical Layer (PHY) Specificaitons", IEEE Std 802.11—2007 (Revision of IEEE Std 802.11—1999), (Jun. 12, 2007).
Interdigital LLC, "Cancelling an ongoing CS Fallback call request in EPS," 3GPP TSG CT WG1 Meeting #62, C1-095167 (Nov. 9-13, 2009).
Nokia et al., "Pseudo-CR on introduction of Extended Service Request," 3GPP TSG CT WG1 Meeting #55bis, C1-085520 (Oct. 6-10, 2008).
Third Generation Partnership Project, "Technical Specification Group Services and System Aspects; General Packet Radio Service (GPRS); Service description; Stage 2 (Release 7)", 3GPP TS 23.060, V7.8.0, (Sep. 2008).
Third Generation Partnership Project, "Technical Specification Group Services and System Aspects; General Packet Radio Service (GPRS); Service description; Stage 2 (Release 7)", 3GPP TS 23.060, V7.9.0, (Dec. 2009).
Third Generation Partnership Project, "Technical Specification Group Services and System Aspects; General Packet Radio Service (GPRS); Service description; Stage 2 (Release 8)", 3GPP TS 23.060, V8.3.0, (Dec. 2008).
Third Generation Partnership Project, "Technical Specification Group Services and System Aspects; General Packet Radio Service (GPRS); Service description; Stage 2 (Release 8)", 3GPP TS 23.060, V8.7.0, (Dec. 2009).
Third Generation Partnership Project, "Technical Specification Group Services and System Aspects; General Packet Radio Service (GPRS); Service description; Stage 2 (Release 9)", 3GPP TS 23.060, V9.3.0, (Dec. 2009).
Third Generation Partnership Project, "Technical Specification Group Core Network and Terminals; Non-Access-Stratum (NAS) Protocol for Evolved Packet System (EPS); Stage 3 (Release 8)", 3GPP TS 24.301 V8.0.0, (Dec. 2008).
Third Generation Partnership Project, "Technical Specification Group Core Network and Terminals; Non-Access-Stratum (NAS) Protocol for Evolved Packet System (EPS); Stage 3 (Release 8)", 3GPP TS 24.301 V8.4.0, (Dec. 2009).
Third Generation Partnership Project, "Technical Specification Group Core Network and Terminals; Non-Access-Stratum (NAS) Protocol for Evolved Packet System (EPS); Stage 3 (Release 9)", 3GPP TS 24.301 V9.1.0, (Dec. 2009).
Third Generation Partnership Project, "Technical Specification Group Services and System Aspects; Circuit Switched Fallback in Evolved Packet System; Stage 2 (Release 8)", 3GPP TS 23.272 V8.2.0, (Dec. 2008).
Third Generation Partnership Project, "Technical Specification Group Services and System Aspects; Circuit Switched Fallback in Evolved Packet System; Stage 2 (Release 8)", 3GPP TS 23.272 V8.6.0, (Dec. 2009).
Third Generation Partnership Project, "Technical Specification Group Services and System Aspects; Circuit Switched Fallback in Evolved Packet System; Stage 2 (Release 9)", 3GPP TS 23.272 V9.2.0, (Dec. 2009).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.4.0 (Dec. 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331 V8.8.0 (Dec. 2009).
Third Generation Partnership Project, "Technical Specification Group Radio Access Network; Evolved Universal Terrestrial Radio Access (E-UTRA) Radio Resource Control (RRC); Protocol Specification (Release 9)", 3GPP TS 36.311 V9.0.0 (Sep. 2009).
Third Generation Partnership Project, "Technical Specification Group Services and System Aspects; General Packet Radio Service (GPRS) enhancements for Evolved Universal Terrestrial Radio Access Network (E-UTRAN) Access (Release 8)", 3GPP TS 23.401 V8.4.1 (Dec. 2008).
Third Generation Partnership Project, "Technical Specification Group Services and System Aspects; General Packet Radio Service (GPRS) enhancements for Evolved Universal Terrestrial Radio Access Network (E-UTRAN) Access (Release 8)", 3GPP TS 23.401 V8.8.0 (Dec. 2009).
Third Generation Partnership Project, "Technical Specification Group Services and System Aspects; General Packet Radio Service (GPRS) enhancements for Evolved Universal Terrestrial Radio Access Network (E-UTRAN) Access (Release 9)", 3GPP TS 23.401 V9.3.0 (Dec. 2009).
Third Generation Partnership Project, "Technical Specification Group Radio Access Network; Radio Resource Control (RRC); Protocol Specification (Release 5)," 3GPP TS 25.331 V5.23.0 (Dec. 2008).
Third Generation Partnership Project, "Technical Specification Group Radio Access Network; Radio Resource Control (RRC); Protocol Specifications (Release 5)," 3GPP TS 25.331 V5.24.0 (Jun. 2009).
Third Generation Partnership Project, "Technical Specification Group Radio Access Network; Radio Resource Control (RRC); Protocol Specification (Release 6)," 3GPP TS 25.331 V6.20.0 (Dec. 2008).
Third Generation Partnership Project, "Technical Specification Group Radio Access Network; Radio Resource Control (RRC); Protocol Specification (Release 6)," 3GPP TS 25.331 V6.23.0 (Sep. 2009).
Third Generation Partnership Project, "Technical Specification Group Radio Access Network; Radio Resource Control (RRC); Protocol Specification (Release 7)," 3GPP TS 25.331 V7.11.0 (Dec. 2008).
Third Generation Partnership Project, "Technical Specification Group Radio Access Network; Radio Resource Control (RRC); Protocol Specification (Release 7)," 3GPP TS 25.331 V7.14.0 (Sep. 2009).
Third Generation Partnership Project, "Technical Specification Group Radio Access Network; Radio Resource Control (RRC); Protocol Specification (Release 8)," 3GPP TS 25.331 V8.5.0 (Dec. 2008).
Third Generation Partnership Project, "Technical Specification Group Radio Access Network; Radio Resource Control (RRC); Protocol Specification (Release 8)," 3GPP TS 25.331 V8.8.0 (Sep. 2009).
Third Generation Partnership Project, "Technical Specification Group Radio Access Network; Radio Resource Control (RRC); Protocol Specification (Release 9)," 3GPP TS 25.331 V9.0.0 (Sep. 2009).
Third Generation Partnership Project, "Technical Specification Group GSM/EDGE Radio Access Network; Mobile radio interface layer 3 specification; Radio Resource Control (RRC) protocol (Releaase 5)", 3GPP TS 44.018 V5.23.0 (Feb. 2009).
Third Generation Partnership Project, "Technical Specification Group GSM/EDGE Radio Access Network; Mobile radio interface layer 3 specification; Radio Resource Control (RRC) protocol (Releaase 6)", 3GPP TS 44.018 V6.24.0 (Feb. 2009).
Third Generation Partnership Project, "Technical Specification Group GSM/EDGE Radio Access Network; Mobile radio interface layer 3 specification; Radio Resource Control (RRC) protocol (Releaase 7)", 3GPP TS 44.018 V7.15.0 (Dec. 2008).
Third Generation Partnership Project, "Technical Specification Group GSM/EDGE Radio Access Network; Mobile radio interface layer 3 specification; Radio Resource Control (RRC) protocol (Releaase 7)", 3GPP TS 44.018 V7.19.0 (Dec. 2009).
Third Generation Partnership Project, "Technical Specification Group GSM/EDGE Radio Access Network; Mobile radio interface

(56) References Cited

OTHER PUBLICATIONS layer 3 specification; Radio Resource Control (RRC) protocol (Releaase 8)", 3GPP TS 44.018 V8.5.0 (Dec. 2008).
Third Generation Partnership Project, "Technical Specification Group GSM/EDGE Radio Access Network; Mobile radio interface layer 3 specification; Radio Resource Control (RRC) protocol (Releaase 8)", 3GPP TS 44.018 V8.9.0 (Dec. 2009).
Third Generation Partnership Project, "Technical Specification Group GSM/EDGE Radio Access Network; Mobile radio interface layer 3 specification; Radio Resource Control (RRC) protocol (Releaase 9)", 3GPP TS 44.018 V9.3.0 (Dec. 2009).

* cited by examiner

METHOD AND APPARATUS FOR CANCELING A CIRCUIT SWITCHED FALLBACK

CROSS REFERENCE TO RELATED APPLICATIONS

This application is a continuation of U.S. patent application Ser. No. 12/683,212 filed Jan. 6, 2010, and issued as U.S. Pat. No. 8,340,023 on Dec. 25, 2012, which claims the benefit of U.S. Provisional Application No. 61/142,787 filed on Jan. 6, 2009, the contents of which are hereby incorporated by reference.

TECHNOLOGY FIELD

This application is related to wireless communications.

BACKGROUND

It has been a goal in wireless communications to devise a mechanism to enable a wireless transmit/receive unit (WTRU) to place or receive a communication during an ongoing session without service interruption. For example, in a Third Generation Partnership Project (3GPP) Long Term Evolution (LTE) scenario, a goal has been to devise a mechanism to enable a WTRU, while it is connected to a packet switched (PS) domain of an Evolved Universal Terrestrial Radio Access Network (E-UTRAN), to place (i.e., originating) or receive (i.e., terminating) circuit switched (CS) services or vice versa. Examples of CS services may include at least such services as a CS voice call, a short message service (SMS), location services, or supplementary services.

In some wireless communication deployment scenarios, some services may initially be provided by a particular Radio Access Technology (RAT), in which case the WTRU may be required to perform a handover to a target RAT prior to canceling an initiated service. Performing a handover may lead to service interruption at the source RAT. In systems such as Global System for Mobile communication (GSM), Universal Mobile Telecommunications System (UMTS), or Code Division Multiple Access (CDMA), a user may cancel an ongoing mobile originated (MO) session request before the session setup is completed. For example, in a GSM deployment scenario, a connection management (CM) entity may handle session cancellation procedures. In this example, if a user decides to cancel an initiated session before the session setup is completed, the CM entity may send a cancel message. A handover to the target RAT, however, may be performed in order to cancel the initiated session.

In an LTE example, a WTRU may perform a CS fallback (CSFB) procedure to initiate a CS session during an ongoing PS session. Because a CS session request via LTE may force the WTRU to change RATs, canceling a CS session request when the WTRU is camped on an LTE cell may cause numerous problems.

For example, depending on the time at which the user cancels the ongoing CSFB procedure, signaling messages may have been exchanged or may be in the process of being exchanged between network entities in preparation to execute the CSFB. This may lead to problems such as service interruption, time delay, or unnecessary resource drain. For example, the source and target network nodes may exchange signaling messages to prepare resources for the terminal. Not expecting the WTRU to cancel the request, the mobility management entity (MME) may begin performing actions to complete the procedure by forwarding user context information to the target RAT to which the WTRU will handover. If the WTRU has an ongoing PS session in LTE, the MME may transfer the required context to the target RAT so that resources may be reserved to handoff the PS session. It would therefore be desirable to have a method and apparatus to address WTRU behavior when a session request is canceled before session setup is completed.

SUMMARY

A method and apparatus may be used for canceling a Circuit Switched (CS) Fallback (CSFB) procedure. The apparatus may transmit a message that indicates a request to cancel the CSFB procedure. The apparatus may continue a Packet Switched (PS) session without performing an intersystem change. If the apparatus receives an intersystem change command, the apparatus may transmit a message to reject the intersystem change command, or it may ignore the intersystem change command.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, an evolved Node-B (eNB), a site controller, an access point (AP), or any other type of interfacing device capable of operating in a wireless environment.

The embodiments described herein may be applicable to any access technology that may support CS or PS sessions. Examples include, but are not limited to, Long Term Evolution (LTE), Wideband Code Division Multiple Access (WCDMA), Global System for Mobile communications (GSM), General Packet Radio Service (GPRS), Enhanced Data rates for Global Evolution (EDGE), Code Division Multiple Access (CDMA2000), IEEE 802 technologies such as 802.11, 802.16 and Worldwide Interoperability for Microwave Access (WiMAX), Universal Mobile Telecommunications System (UMTS), or any future technology. For purposes of explanation, the various embodiments are described in an LTE context, but the various embodiments may be implemented using any technology that may support CS and/or PS sessions.

Figure 1:
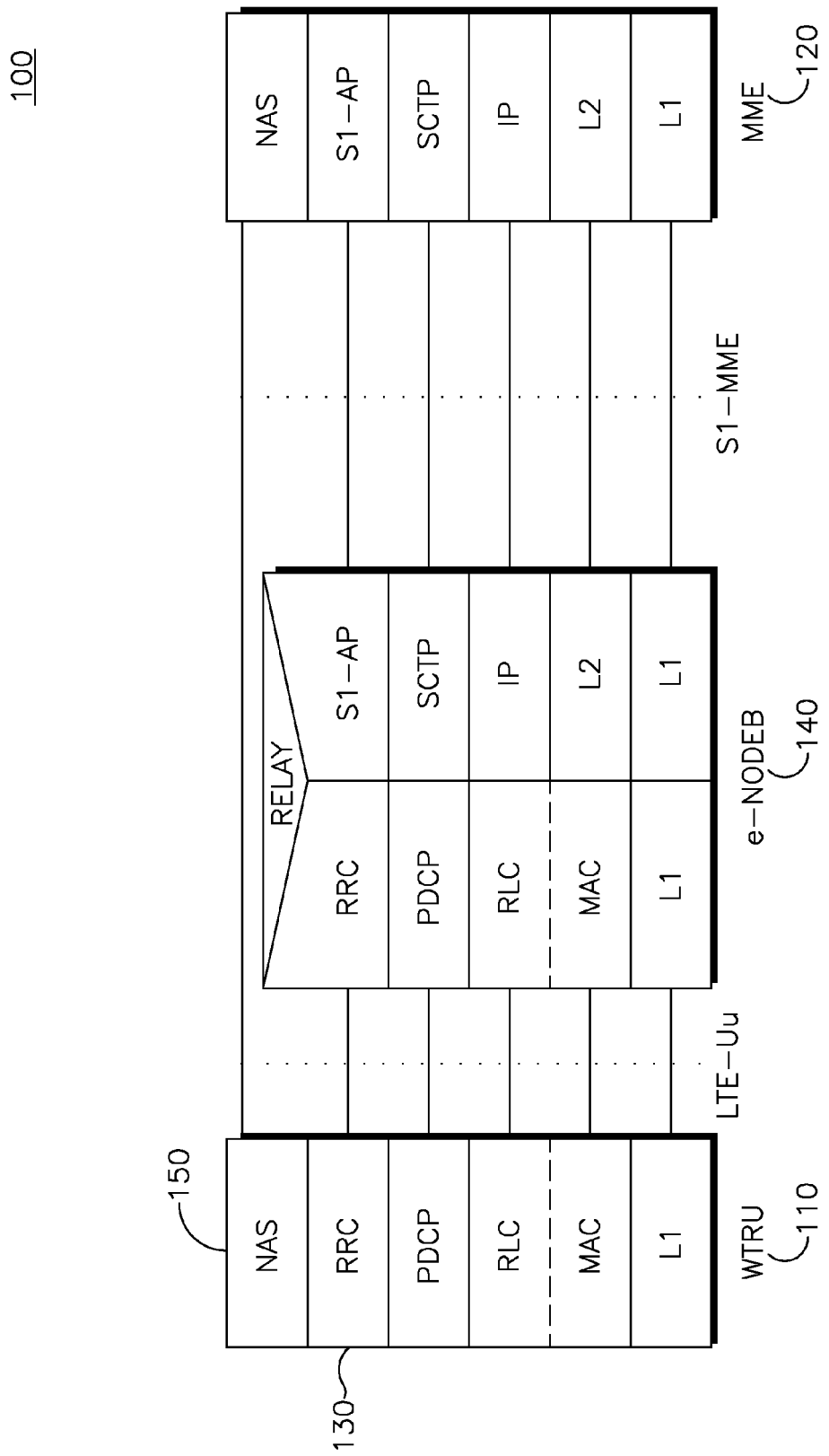
FIG. 1 is a diagram of a protocol stack for the control plane between a WTRU and an MME.

FIG. 1 is a diagram of a protocol stack 100 for the control plane between a WTRU 110 and an Mobility Management Entity (MME) 120. The Radio Resource Control (RRC) component 130 is the main controlling function in the access stratum (AS) and may be responsible for establishing the radio bearers and configuring lower layer components using RRC signaling between the eNB 140 and the WTRU 110. The control plane of the AS handles radio-specific functionality and interacts with the non-access stratum (NAS) 150. The embodiments described may use RRC signaling, NAS signaling, or a combination of both to cancel a Circuit Switched Fallback (CSFB) procedure.

In a typical LTE example, a WTRU may request a CSFB procedure to initiate a CS session while camped on an LTE cell. In response, the WTRU may receive a mobility message to move to a target RAT in accordance with the CSFB procedure. The WTRU may perform an intersystem change to move to the target RAT, as indicated in the mobility message, to proceed with a CS session. An intersystem change may include a PS handover (HO) if the WTRU and the target RAT support PS HO.

If a PS HO is to be performed, the network nodes in the source and target RATs may have already communicated the event and possibly prepared resources for PS HO. In this scenario, if a PS session is ongoing in LTE, the data packets may not be forwarded to the WTRU to avoid packet loss during the HO. The data packet path may be switched to the target RAT, if PS HO is to be performed, where the WTRU may continue receiving and/or transmitting its data packets. If PS HO is not supported in the target RAT, the WTRU's PS session may be suspended for the duration of the CS session. Regardless of whether the target RAT supports PS HO, after the CS session ends, the WTRU may resume its PS session again in LTE.

In the example above, the WTRU may cancel the requested CSFB procedure at any point in time after the WTRU transmits the CSFB request. However, the cancellation of the CSFB procedure may not occur until after the intersystem change is performed. According to the prior art, once the CSFB is requested, the cascade of events that follow cannot be stopped and may result in excess signaling.

Figure 2:
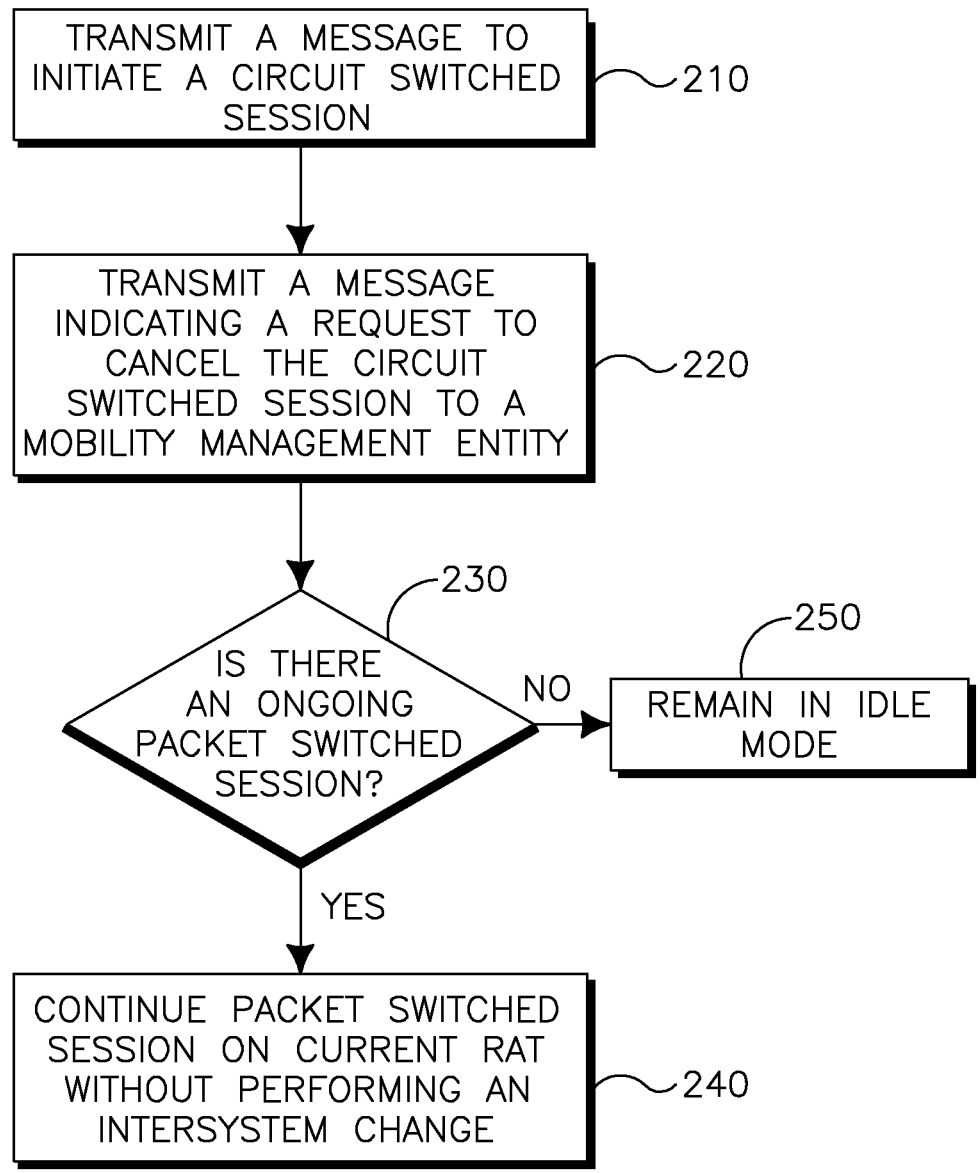
FIG. 2 is a flow diagram of an example method to cancel a CSFB procedure.

FIG. 2 is a flow diagram of an example method 200 to cancel a CSFB procedure. Referring to FIG. 2, a WTRU may transmit a message to initiate a CS session 210. To cancel the initiated CS session, the WTRU may transmit a message indicating a request to cancel the CS session 220. By way of example, the request to cancel may be sent to a mobility management entity (MME). If the there is an ongoing PS session 230, the WTRU may continue the PS session on the current RAT without performing an intersystem change 240. If there is no ongoing PS session 230, the WTRU may remain in Idle Mode 250.

Figure 3:
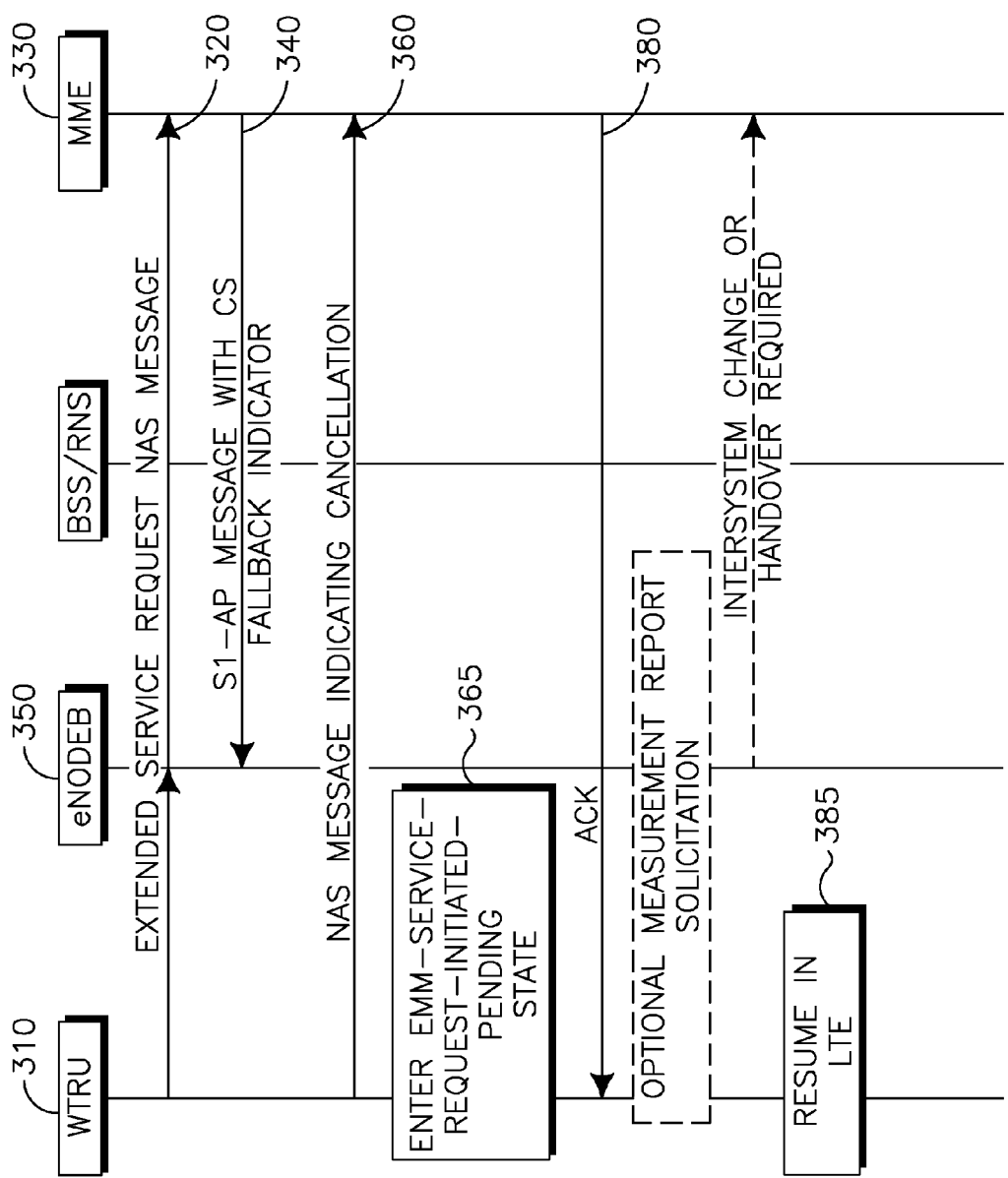
FIG. 3 is a signal flow diagram of an example method that may use a modified Extended Service Request (ESR) to cancel a CSFB procedure.

FIG. 3 is a signal flow diagram of an example method 300 that may use a modified Extended Service Request (ESR) to reduce the amount of signaling that may occur when a WTRU cancels a CSFB procedure. In this method 300, the WTRU 310 may transmit an ESR 320 to an MME 330 in an RRC message to trigger a CSFB procedure. A timer (not shown) may be started when the CSFB procedure is triggered. In response to the triggered CSFB procedure, the MME 330 may transmit a S1-AP message 340 to an eNB 350. The S1-AP message 340 may contain a CSFB indicator.

As shown in FIG. 3, the WTRU 310 may transmit a modified ESR message 360 to the MME 330 to indicate the cancellation event for an ongoing CSFB procedure. The modified ESR message 360 may be transmitted as a NAS message and may be transmitted at any time before an intersystem change or HO message is received at the WTRU 310. After transmitting the modified ESR message 360, the WTRU 310 may enter a state, such as an EMM-Service-Request-Initiated-Cancel-Pending state 365, for example. The EMM-Service-Request-Initiated-Cancel-Pending state may have an associated timer (not shown).

A timer (not shown) may be associated with the transmitted modified ESR message 360. The network may transmit an acknowledgement message 380 to assure the WTRU 310 that the cancel request was received and will be processed accordingly. As such, the WTRU 310 may not fallback to a CS RAT. If there is an active PS session, the session may be resumed in LTE 385. In this example, the source and target network nodes may perform signaling to cancel the CSFB procedure, for example by releasing any reserved resources in the target RAT/cell.

The WTRU 310 may, after canceling the CSFB procedure, stop the timer related to the ESR that initiated the CSFB procedure. This timer may be stopped when the WTRU 310 transmits the modified ESR message 360 to cancel the CSFB procedure, or when the WTRU 310 receives the acknowledgement 380 indicating that the CSFB procedure is canceled. After the CSFB is canceled, the WTRU may enter an EMM-REGISTERED state (not shown).

In this method, specific considerations and exceptions may be made since a timer may have started when the initial ESR triggered the CSFB procedure. Moreover, after transmitting the ESR 320, the WTRU 310 may enter an EMM-Service-Request-Initiated state. One exception may be that the WTRU 310 remains in this state, but restarts its timer and awaits a new acknowledgement message. Another option may be to enter a new substrate within the current state and initiate an associated timer.

Figure 4:
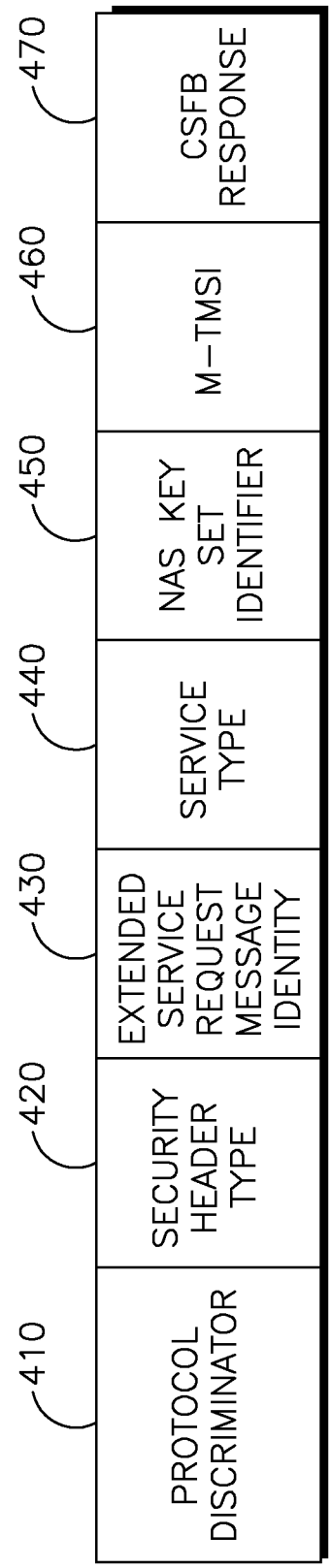
FIG. 4 is a diagram of the modified ESR message described in FIG. 3.

The contents of the modified ESR message described in FIG. 3 are shown in FIG. 4. Referring to FIG. 4, the modified ESR message 400 may contain a Protocol Discriminator field 410, a Security Header Type field 420, an Extended Service Request Message Identity field 430, a Service Type field 440, a NAS Key Set Identifier field 450, an MME Temporary Mobile Subscriber Identity (M-TMSI) field 460, and a CSFB Response field 470. The Service Type field 440 may indicate the type of service that the WTRU is requesting and may be modified to include a request to cancel an ongoing CSFB procedure. The details of the possible values of this field are shown below in Table 1.

TABLE 1

Service Type Field.

| Service Type Value Bits | | | | |
|---|---|---|---|---|
| 4 | 3 | 2 | 1 | Description |
| 0 | 0 | 0 | 0 | Mobile originating CS fallback |
| 0 | 0 | 0 | 1 | Mobile terminating CS fallback |
| 0 | 0 | 1 | 0 | Mobile originating CS fallback emergency call |
| 0 | 0 | 1 | 1 | Request to cancel ongoing CSFB procedure |

All other values may be reserved

Figure 5:
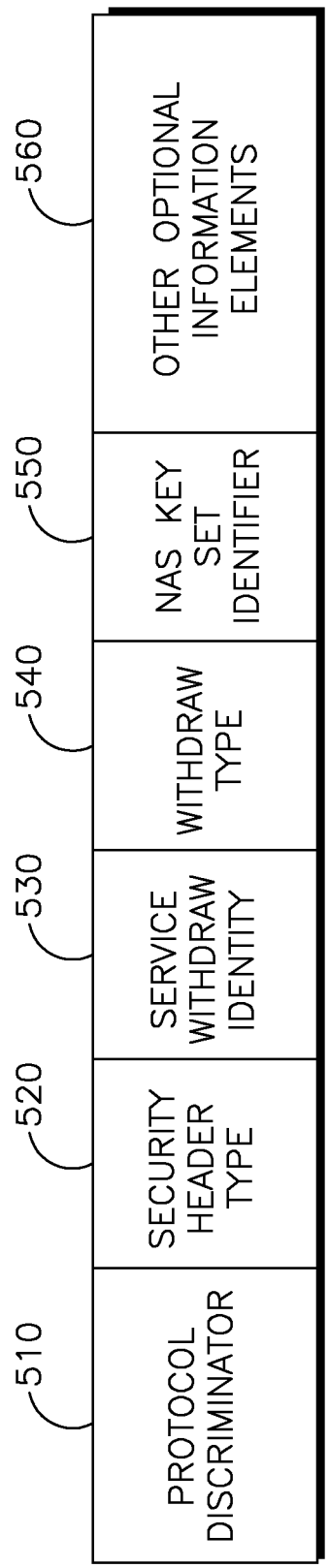
FIG. 5 is a diagram of a NAS message.

As an alternative to transmitting a modified ESR message 360, the WTRU may transmit a NAS message 500 with the contents as shown in FIG. 5. As shown in FIG. 5, the NAS message 500 may contain a Protocol Discriminator Information Element (IE) 510, a Security Header Type IE 520, a Service Withdraw Identity IE 530, a Withdraw Type IE 540, a NAS Key Set Identifier IE 550, and/or other optional IEs 560. The Withdraw Type IE may be used to indicate a service that the WTRU is requesting to cancel. The Withdraw Type IE may be four bits and contain the information as shown in Table 2 below.

TABLE 2

Service Withdraw Type IE

| Service Withdraw Type Value Bits | | | | |
| --- | --- | --- | --- | --- |
| 4 | 3 | 2 | 1 | Description |
| 0 | 0 | 0 | 0 | Mobile originating CS fallback |
| 0 | 0 | 0 | 1 | Mobile terminating CS fallback |
| 0 | 0 | 1 | 0 | Allocate dedicated Evolved Packet System (EPS) bearer request |
| x | x | x | x | Others |

All other values may be reserved

Figure 6:
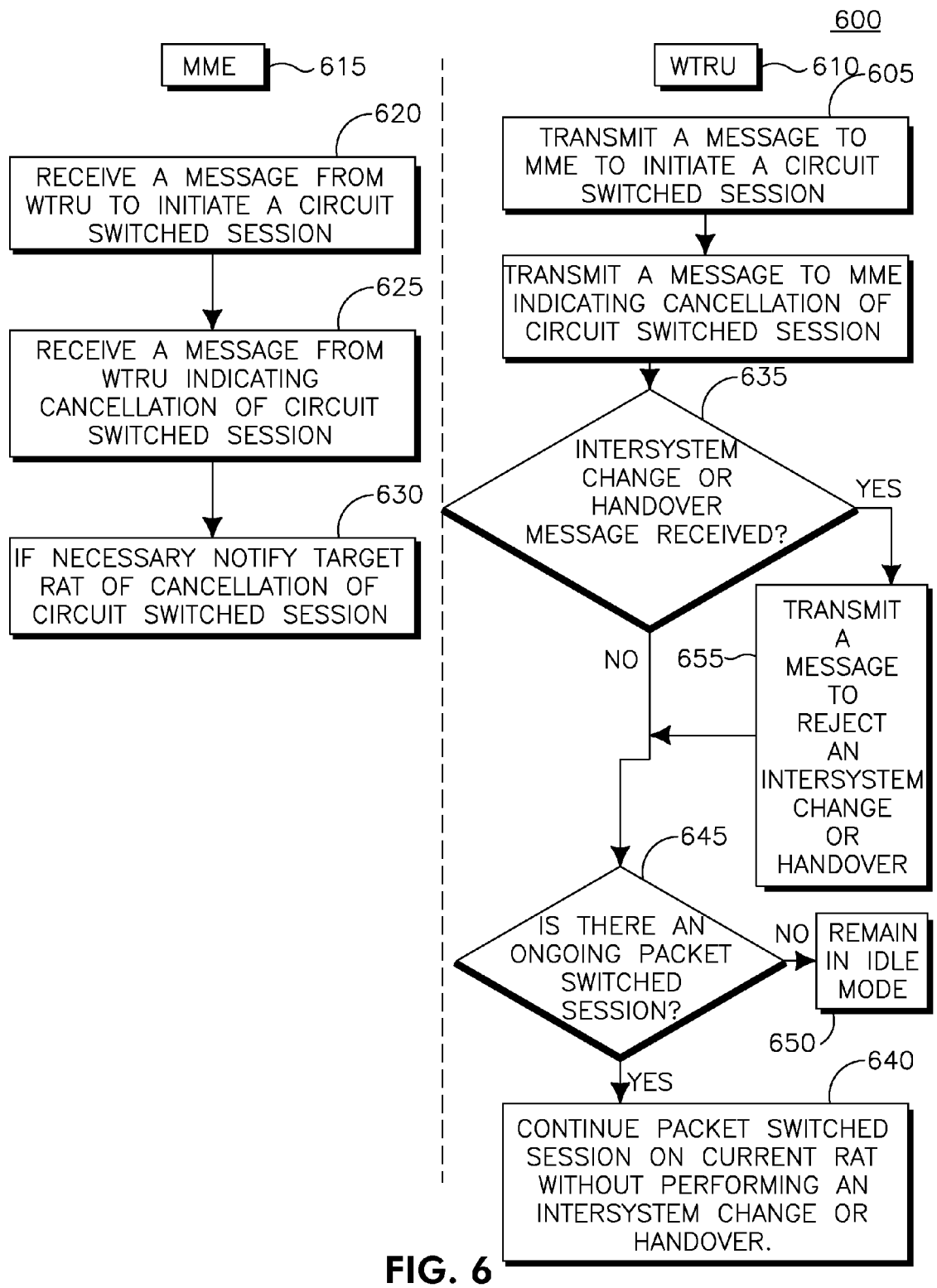
FIG. 6 is a flow diagram of an alternate method to cancel a CSFB procedure.

FIG. 6 is a flow diagram of an alternate method to cancel a CSFB procedure. Referring to FIG. 6, the WTRU 610 may transmit a message to the MME 615 to initiate a CS session. Upon receiving the message to initiate a CS session 620, the MME 615 may notify a target RAT to begin reservation of PS and/or CS resources (not shown). In the meantime, the MME 615 may receive a message that indicates a request to cancel the CSFB procedure 625. If the MME 615 receives this message after notifying the target RAT to setup a CS session, the MME 615 may notify the target RAT of the request to cancel the CSFB procedure 630. If the MME 615 receives this message before notifying the target RAT to setup the CS session, the MME may not notify the target RAT of the request to cancel the CSFB procedure. The target RAT may transmit an intersystem change or HO message (not shown) if the notification of the request to cancel the CSFB procedure is not received in time.

Referring again to FIG. 6, the WTRU 610 may determine whether an intersystem change or HO message is received 635. If an intersystem change or HO message is not received, the WTRU 610 may continue a PS session on the current RAT 640 without performing an intersystem change or HO. If there is no ongoing PS session 645, the WTRU 610 may remain in Idle Mode 650.

If the WTRU 610 receives an intersystem change or HO message, the WTRU 610 may transmit a message to reject the intersystem change or HO 655. The message to reject the intersystem change or HO 655 may be transmitted as a NAS message to the MME 615 and/or to the eNB (not shown) in the target RAT as an RRC message. Thus, both the RRC and NAS components in the network may receive a request to cancel the CSFB procedure. For both of these alternatives, the WTRU 610 may transmit the messages at any time, for example, before or after receiving a message to perform an intersystem change or HO to a target RAT. The RRC and NAS components in the network may acknowledge the receipt of their respective messages by transmitting another message to the WTRU. The NAS and the RRC components may also take specific actions to cancel the CSFB procedure. For example, the MME may contact other network nodes, such as a Serving General Packet Radio Service (GPRS) Support Node (SGSN), to cancel any preparations for an intersystem change or HO. Similar actions may be triggered by the RRC in the eNB.

Figure 7:
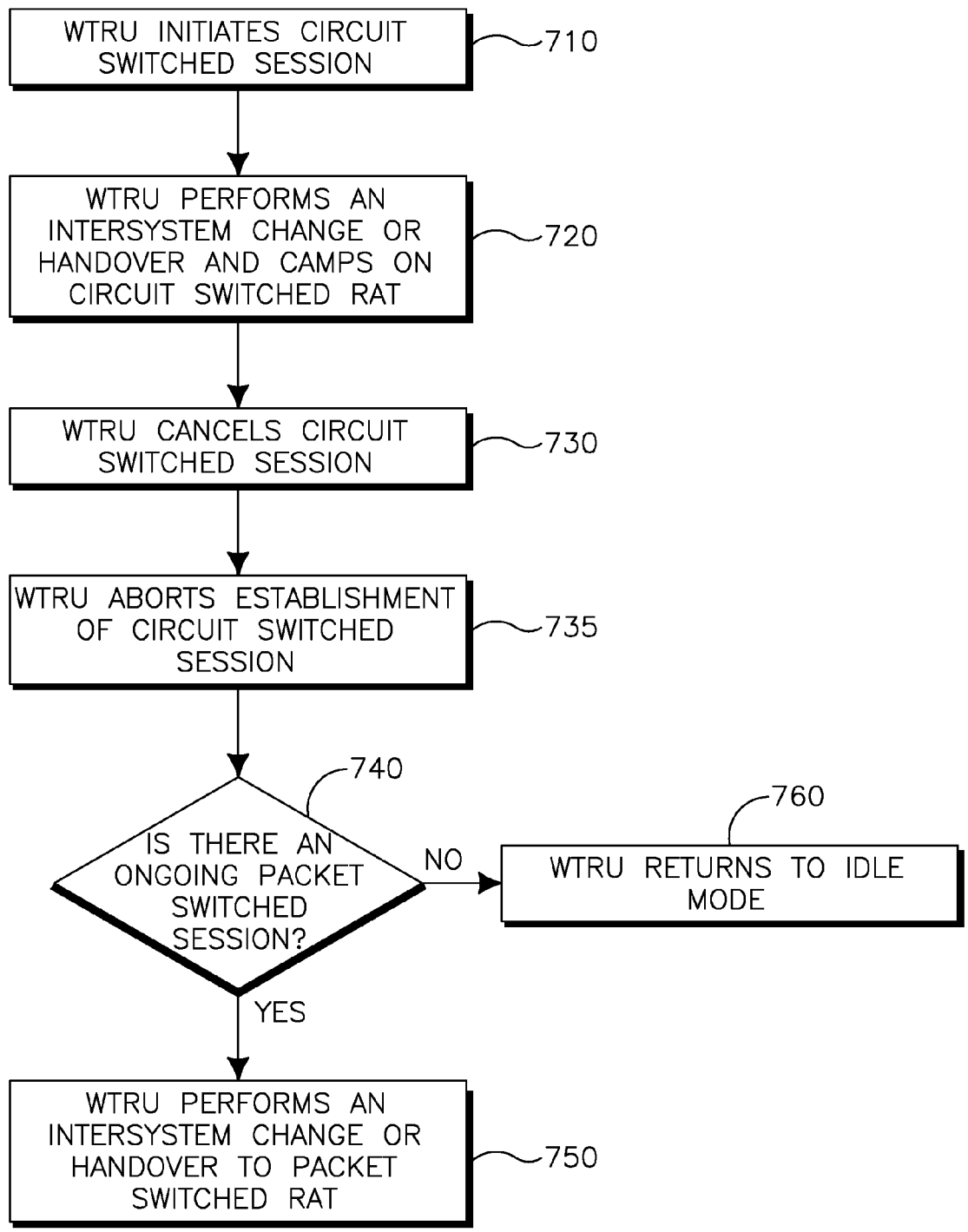
FIG. 7 is a flow diagram of an example method to cancel a CSFB procedure by performing an additional handover.

FIG. 7 is a flow diagram of an example method 700 to cancel a CSFB procedure by performing an additional intersystem change or HO. The WTRU may perform an intersystem change or HO to the target RAT and directly return to LTE by performing another intersystem change or HO. If the CS session is not canceled in LTE, it may be canceled in the target RAT.

Referring to FIG. 7, the WTRU may initiate a CS session 710 as described in the examples above. The WTRU may then perform an intersystem change or HO and camp on the CS RAT 720. The WTRU may then cancel the CS session 730 while on the CS RAT. The WTRU may cancel the CS session prior to performing an intersystem change or HO to the CS RAT. Based on the knowledge of the cancellation, the WTRU may abort the establishment of the CS session 735 by not transmitting a CM Service Request message. If there is an ongoing PS session 740, the WTRU may perform an intersystem change or HO to the PS RAT 750. If there is no ongoing PS session, the WTRU may return to Idle Mode 760. In this example, the WTRU may return to LTE by sending a fake measurement to indicate that the CS RAT's signal strength is weak compared to that of LTE. Alternatively, the WTRU may perform an Idle Mode cell reselection to LTE.

Figure 8:
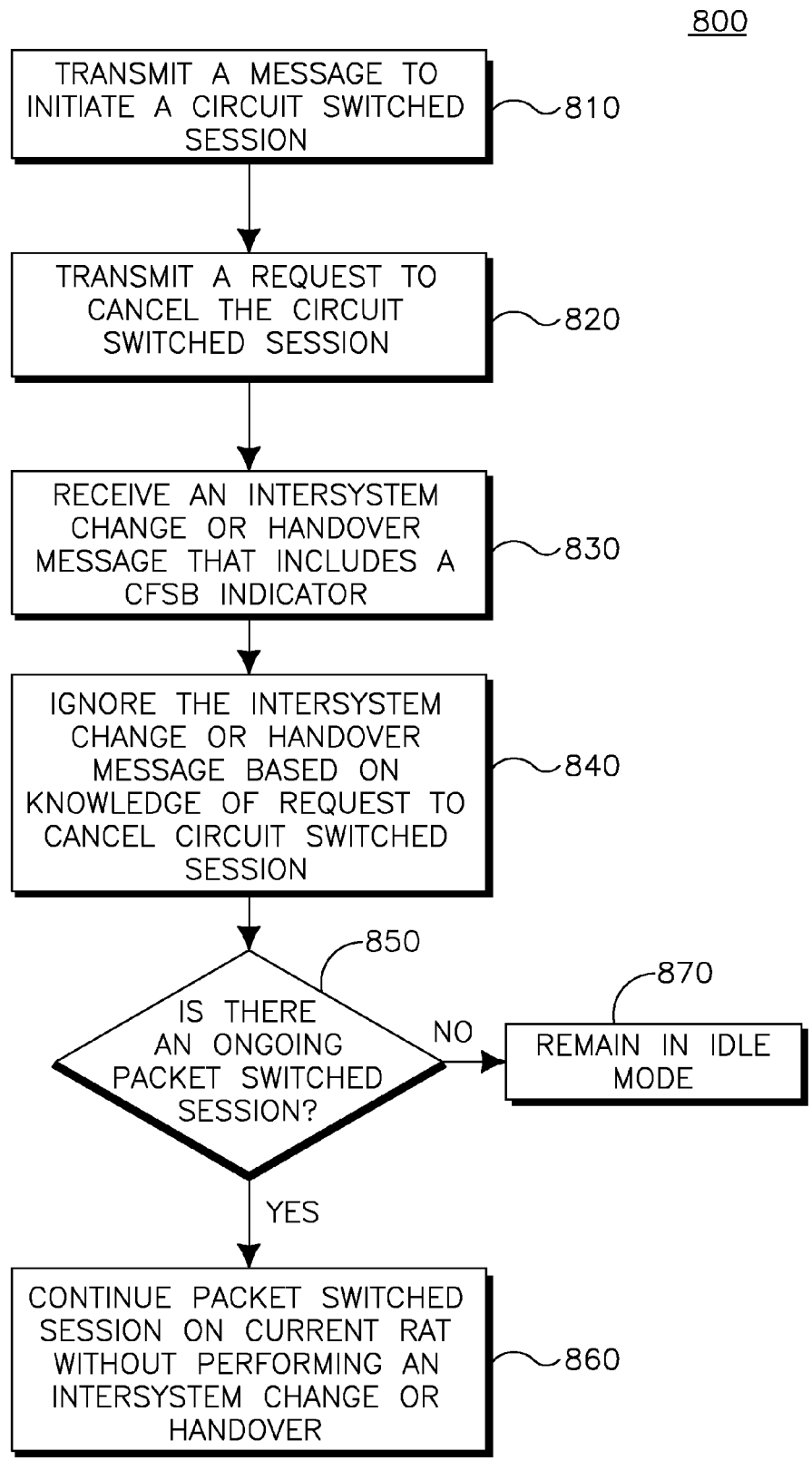
FIG. 8 is a flow diagram of an example method to cancel a CSFB procedure by ignoring a HO command.

FIG. 8 is a flow diagram of an example method to cancel a CSFB procedure by ignoring a message to perform an intersystem change or HO. Referring to FIG. 8, the WTRU may transmit a message to initiate a CS session 810 before transmitting a request to cancel the CSFB 820. In response to transmitting the request to cancel the CSFB 820, the WTRU may receive an intersystem change or HO message 830 that includes an indicator. The indicator may specify whether the intersystem change or HO is due to the CSFB. The WTRU may ignore the intersystem change or HO message 840 based on the knowledge the WTRU transmitted a request to cancel the CSFB. If there is an ongoing PS session 850, the WTRU may continue the PS session 860 on the current RAT without performing an intersystem change or HO. If there is no ongoing PS session 850, the WTRU may remain in Idle Mode 870.

There may be an associated timer, such as a T304, with the intersystem change or HO message. If the timer expires prior to completing the intersystem change or HO, the WTRU may initiate a connection re-establishment procedure. The WTRU may not perform the intersystem change or HO until the timer expires. Alternatively, the WTRU may set the value of the timer T304 to zero after receiving the intersystem change or HO message to directly initiate a connection re-establishment procedure. The WTRU may then resume its services over LTE.

Figure 9:
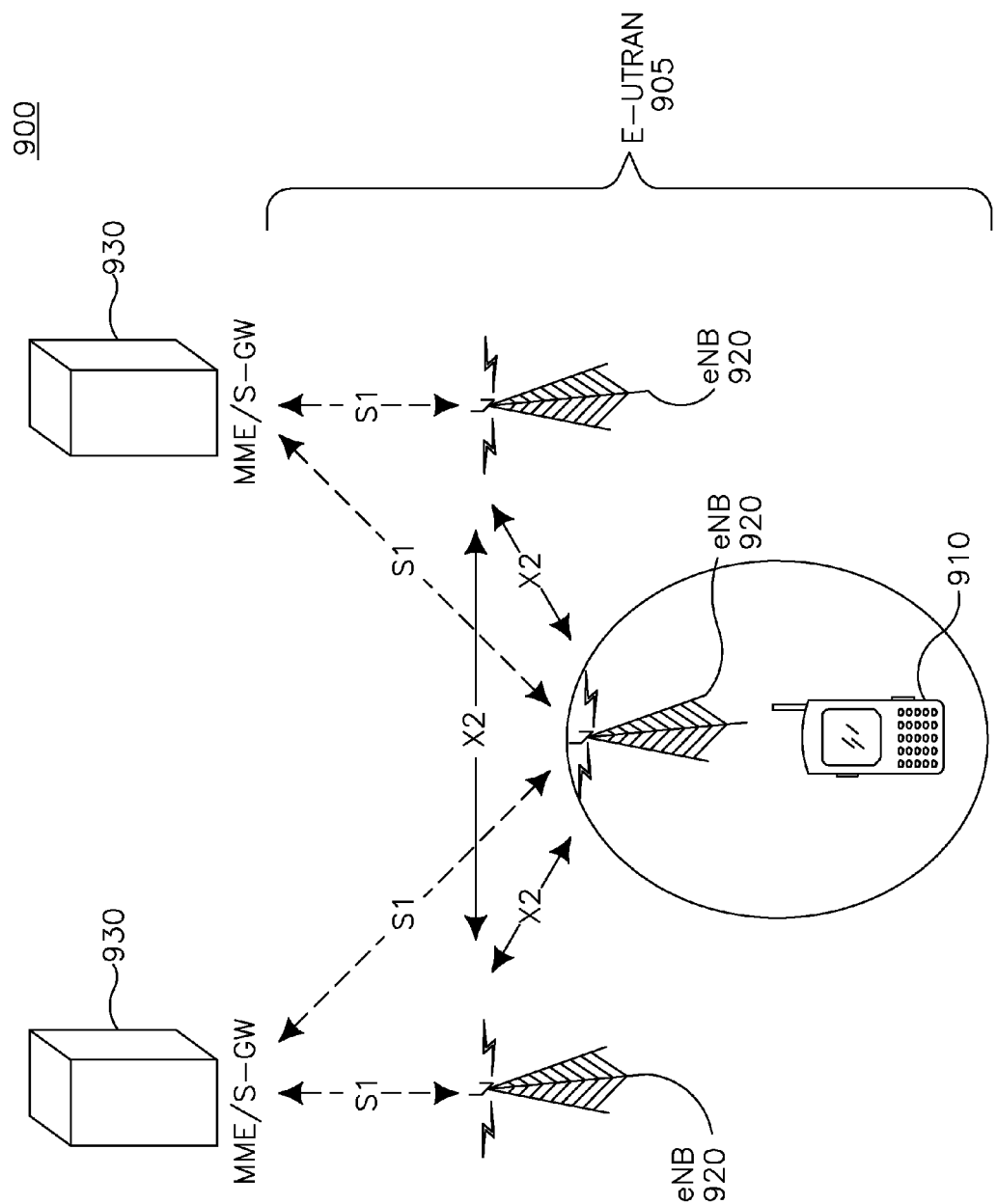
FIG. 9 is a diagram of a Long Term Evolution (LTE) wireless communication system/access network.

FIG. 9 shows a Long Term Evolution (LTE) wireless communication system/access network 900 that includes an Evolved-Universal Terrestrial Radio Access Network (E-UTRAN) 905. The E-UTRAN 905 includes a WTRU 910 and several evolved Node-Bs, (eNBs) 920. The WTRU 910 is in communication with an eNB 920. The eNBs 920 interface with each other using an X2 interface. Each of the eNBs 920 interface with a Mobility Management Entity (MME)/Serving GateWay (S-GW) 930 through an S1 interface. Although a single WTRU 910 and three eNBs 920 are shown in FIG. 9, it should be apparent that any combination of wireless and wired devices may be included in the wireless communication system access network 200.

Figure 10:
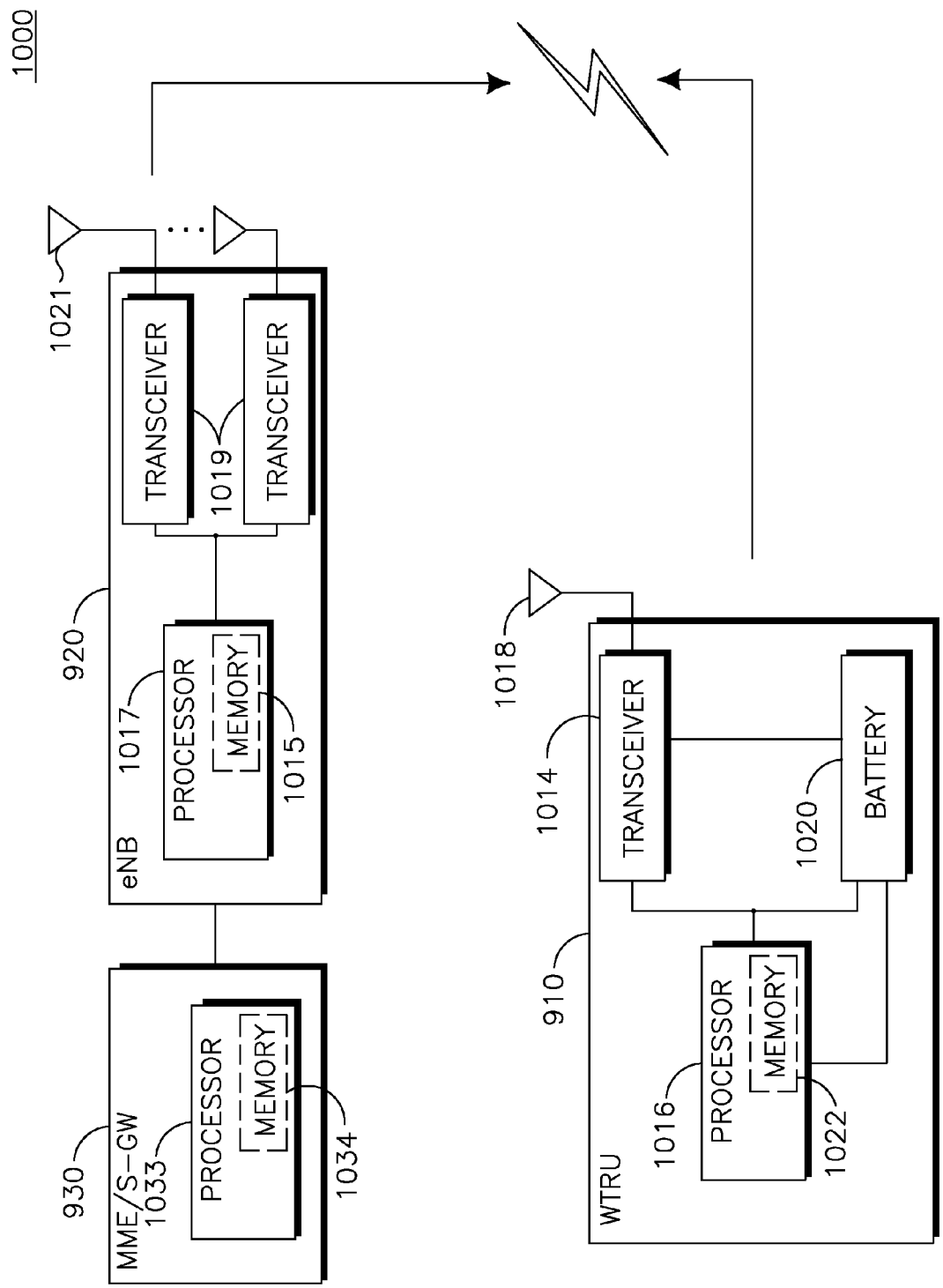
FIG. 10 is a block diagram of an example LTE wireless communication system.

FIG. 10 is a block diagram of an example LTE wireless communication system 1000 including the WTRU 910, the eNB 920, and the MME/S-GW 930. As shown in FIG. 10, the WTRU 910, the eNB 920 and the MME/S-GW 930 are configured to perform a method for canceling a CSFB.

In addition to the components that may be found in a typical WTRU, the WTRU 910 includes a processor 1016 with an optional linked memory 1022, at least one transceiver 1014, an optional battery 1020, and an antenna 1018. The processor 1016 is configured to perform a method for canceling a CSFB. The transceiver 1014 is in communication with the processor 1016 and the antenna 1018 to facilitate the transmission and reception of wireless communications. In case a battery 1020 is used in the WTRU 910, it powers the transceiver 1014 and the processor 1016.

In addition to the components that may be found in a typical eNB, the eNB 920 includes a processor 1017 with an optional linked memory 1015, transceivers 1019, and antennas 1021. The processor 1017 is configured to perform a method for canceling a CSFB. The transceivers 1019 are in communication with the processor 1017 and antennas 1021 to facilitate the transmission and reception of wireless communications. The eNB 920 is connected to the Mobility Management Entity/Serving GateWay (MME/S-GW) 930 which includes a processor 1033 with an optional linked memory 1034.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method for use in a wireless transmit/receive unit (WTRU), the method comprising:
    transmitting a first message to initiate a Circuit Switched (CS) Fallback (CSFB) procedure;
    receiving an indication that the CSFB procedure is canceled; and
    stopping a timer in response to receiving the indication that the CSFB procedure is canceled.

2. The method of claim 1 further comprising:
    transmitting a second message that indicates a request to cancel a CSFB procedure.

3. The method of claim 2, wherein the second message is a non-access stratum (NAS) message.

4. The method of claim 2, wherein the second message is a non-access stratum (NAS) message that indicates a cancellation of the first message.

5. The method of claim 2, wherein the request to cancel the CSFB procedure is indicated in a Service Type field of the second message.

6. The method of claim 1 further comprising:
    continuing a packet switched (PS) session on a Long Term Evolution (LTE) Radio Access Technology (RAT).

7. The method of claim 1 further comprising:
    receiving an intersystem change command; and
    transmitting a message to reject the intersystem change command.

8. The method of claim 7, wherein the message to reject the intersystem change command is a non-access stratum (NAS) message transmitted to a mobility management entity (MME).

9. The method of claim 7, wherein the message to reject the intersystem change command is a radio resource control (RRC) message transmitted to an evolved NodeB (eNB).

10. A wireless transmit/receive unit (WTRU) comprising:
    a transmitter configured to transmit a first message to initiate a Circuit Switched (CS) Fallback (CSFB) procedure;
    a receiver configured to receive an indication that the CSFB procedure is canceled; and
    a processor configured to stop a timer in response to the received indication that the CSFB procedure is canceled.

11. The WTRU of claim 10, wherein the transmitter is configured to transmit a second message that indicates a request to cancel a CSFB procedure.

12. The WTRU of claim 11, wherein the transmitter is configured to transmit the second message as a non-access stratum (NAS) message.

13. The WTRU of claim 11, wherein the transmitter is configured to transmit an indication of the request to cancel the CSFB procedure in a Service Type field of the second message.

14. The WTRU of claim 10, wherein the transmitter and receiver are further configured to continue a packet switched (PS) session on a Long Term Evolution (LTE) Radio Access Technology (RAT).

15. The WTRU of claim 14, wherein the transmitter is configured to transmit the first message to reject an intersystem change command as a non-access stratum (NAS) message to a mobility management entity (MME).

* * * * *